(12) United States Patent
Blum et al.

(10) Patent No.: US 7,337,593 B2
(45) Date of Patent: Mar. 4, 2008

(54) METHOD OF FORMING A BLISTER PACKAGE INCLUDING A FLUOROPOLYMER LAYER

(75) Inventors: John B. Blum, Middletown, DE (US); Sandra E. Luciano, North East, MD (US)

(73) Assignee: Honeywell International Inc., Morristown, NJ (US)

( * ) Notice: Subject to any disclaimer, the term of this patent is extended or adjusted under 35 U.S.C. 154(b) by 582 days.

(21) Appl. No.: 10/958,564

(22) Filed: Oct. 5, 2004

(65) Prior Publication Data
US 2005/0079307 A1 Apr. 14, 2005

Related U.S. Application Data

(62) Division of application No. 10/241,095, filed on Sep. 11, 2002, now abandoned.

(60) Provisional application No. 60/375,389, filed on Apr. 25, 2002.

(51) Int. Cl.
*B65B 47/02* (2006.01)
*B32B 27/08* (2006.01)

(52) U.S. Cl. ............ 53/453; 53/471; 53/478; 428/35.7; 428/35.8

(58) Field of Classification Search ............ None
See application file for complete search history.

(56) References Cited

U.S. PATENT DOCUMENTS

| | | | | |
|---|---|---|---|---|
| 3,567,013 A * | 3/1971 | Tannebaum | .................. | 206/538 |
| 3,755,042 A * | 8/1973 | Robertson et al. | .......... | 156/245 |
| 3,977,153 A * | 8/1976 | Schrenk | ....................... | 53/453 |
| 4,211,326 A * | 7/1980 | Hein et al. | .................. | 206/484 |
| 5,139,878 A | 8/1992 | Kim et al. | ................... | 428/421 |
| 5,874,035 A | 2/1999 | Tsai et al. | .............. | 264/173.13 |
| 5,911,319 A | 6/1999 | Porcelli et al. | ............ | 206/63.5 |
| 5,927,500 A | 7/1999 | Godfrey et al. | ............. | 206/531 |
| 5,945,221 A | 8/1999 | Tsai et al. | ................... | 428/412 |
| 6,306,503 B1 | 10/2001 | Tsai | .......................... | 428/412 |
| 6,589,642 B1 * | 7/2003 | Miller et al. | ................. | 428/220 |
| 6,592,978 B1 * | 7/2003 | Miller et al. | ................. | 428/213 |

FOREIGN PATENT DOCUMENTS

WO WO 93/06159 1/1993

\* cited by examiner

*Primary Examiner*—Stephen F. Gerrity
(74) *Attorney, Agent, or Firm*—Carrie Beatus

(57) ABSTRACT

Blister packages are provided which are formed from multilayered films having a lid-stock film which is heat sealed directly to a fluoropolymer film. A polymeric base layer is adhered to a fluoropolymer layer via a first intermediate adhesive tie layer; a support layer is adhered to the fluoropolymer layer via a second intermediate adhesive tie layer; and a metallic foil layer is adhered to the support layer via a third intermediate adhesive tie layer. The blister has a greatly improved moisture barrier over blister packages of the prior art.

14 Claims, 2 Drawing Sheets

METHOD OF FORMING A BLISTER PACKAGE INCLUDING A FLUOROPOLYMER LAYER

CROSS REFERENCE TO RELATED APPLICATIONS

This application is a divisional of U.S. patent application Ser. No. 10/241,095, filed Sep. 11, 2002, now abandoned, the entire disclosure of which is incorporated herein by reference, and which application claims priority to U.S. provisional application Ser. No. 60/375,389, filed Apr. 25, 2002, the entire disclosure of which is incorporated herein by reference.

BACKGROUND OF THE INVENTION

1. Field of the Invention

The invention relates to improved blister packages. More particularly, the invention pertains to multilayered films for forming improved blister packages having a lid-stock film which is capable of being heat sealed directly to fluoropolymer films, including polychlorotrifluoroethylene (PCTFE) homopolymers or copolymers.

2. Description of the Related Art

It is known to produce multilayered structures to take advantage of different properties exhibited by the various layers in the structures. Typical of multilayered structures are multilayered films in which different layers have specific characteristics. These films may then be used in packaging applications having customized properties that may be required for a particular packaged product. For example, films which are used to protect food, medicines, paints, adhesives, biomaterials, chemicals, etc., require properties such as good thermal and environmental stability, UV blocking characteristics, transparency in visible light wavelengths and an excellent moisture barrier.

In many packaging applications it is desirable to utilize fluoropolymer films which are particularly desirable because they have an excellent moisture barrier property. This property is extremely important when the films are used to form packages for products intended for human consumption. Most fluoropolymers, especially PCTFE and ethylene-chlorotrifluoroethylene (ECTFE), exhibit such excellent moisture barrier properties, making them exceptionally good polymers as barrier packaging material.

In forming packaging films, such fluoropolymers are typically laminated with other polymeric films to form multilayered structures, with only a thin layer of the fluoropolymer needed to take advantage of the desirable properties. However, one significant problem is that fluoropolymers do not adhere strongly to most other polymers. In fact, many fluoropolymers are known for their non-stick characteristics. Various attempts have been made to produce multilayer fluoropolymer films. For example, multilayered structures wherein at least one layer is a fluoropolymer and the other layer is a thermoplastic homopolymer or copolymer, have been used for the production of highly oriented, dimensionally stable fluoropolymer films. In such structures, a tie layer or intermediate adhesive layer is necessary to bond the film layers. Multilayer films containing PCTFE and thermoplastic polymer layers are also known. See, for example, U.S. Pat. Nos. 5,874,035 and 5,945,221. However, the structures of the multilayered films are limited because of the inability of fluoropolymer films to sufficiently stick to certain lid-stock film materials, even with an intermediate adhesive layer.

In a typical prior art multilayered blister packaging film, a fluoropolymer layer is attached to a polymeric base layer, e.g. polyvinyl chloride, via an intermediate adhesive layer. A lid-stock film comprised of a polyethylene terephthalate layer attached to an aluminum foil is then adhesively sealed to the base layer to encapsulate a product within the package. This structure has been found to provide sufficient adhesion between the polymeric base layer and the lid-stock film. This structure is also quite effective in preventing the transmission of water vapor and other moisture from the blister side of the film and from the lid-stock side of the package. However, one significant problem associated with prior art blister package multilayered film is that a considerable amount of moisture also enters into the package from between the layers by seeping in through the sides of the package. This is because while fluoropolymer films are known to exhibit excellent moisture barrier properties, other thermoplastic polymers such as polyesters or polyolefins typically have poor moisture barrier properties. Therefore, one potential solution would be to use multiple fluoropolymer films in a package. However, this is a very costly solution to the problem as fluoropolymers are quite expensive. Another potential solution would be to eliminate the non-fluoropolymer films from the structure altogether. However, while the other thermoplastic layers may not provide a good moisture barrier, they do provide other desirable characteristics, such as good mechanical strength, which are necessary for a final product. Furthermore, one additional problem remains the fact that the adhesives of the prior art have not been able to sufficiently adhere fluoropolymer films to other thermoplastic polymer layers in multilayered films. Accordingly, thus far, no prior art structure has functioned to prevent moisture from entering the package through the sides.

Preventing moisture from entering the package from the sides is a problem which is equally important as preventing moisture from entering from a top or bottom surface of the package. Unfortunately, this problem is not appreciated by users of prior art packaging structures. To be sure, the failure to sufficiently prevent all moisture from seeping into a package will cause the product stored within the package to be compromised. It is therefore desirable to provide a multilayered structure having an improved moisture barrier between a PCTFE or other fluoropolymer layer and another polymeric layer, which is capable of blocking substantially all moisture from entering a blister package. The present invention provides an effective solution to this compelling need.

SUMMARY OF THE INVENTION

The invention provides a multilayered film which comprises:
a) a polymeric base layer;
b) a fluoropolymer layer adhered to the polymeric base layer via a first intermediate adhesive tie layer;
c) a support layer adhered to the fluoropolymer layer via a second intermediate adhesive tie layer; and
d) a metallic foil layer adhered to the support layer via a third intermediate adhesive tie layer.

This invention also provides a multilayered film which comprises:
a) a polymeric base layer;
b) a fluoropolymer layer having a first surface adhered to the polymeric base layer; and
c) a metallic foil layer adjacent to a second surface of the fluoropolymer layer.

The invention further provides a package, preferably a pharmaceutical package comprising:
a) a shaped container, preferably in blister form, which is formed from a multilayered film comprising:
  i. a polymeric base layer; and
  ii. a fluoropolymer layer adhered to the polymeric base layer via a first intermediate adhesive tie layer;
b) a pharmaceutical product contained within the shaped blister container; and
c) a lid sealed onto a surface of the container, which lid comprises:
  i. a support layer adhered to the fluoropolymer layer via a second intermediate adhesive tie layer; and
  ii. a metallic foil layer adhered to the support layer via a third intermediate adhesive tie layer.

This invention additionally provides a pharmaceutical package comprising:
a) a shaped blister container which is formed from a multilayered film comprising:
  i. a polymeric base layer; and
  ii. a fluoropolymer layer having a first surface adhered to the polymeric base layer;
b) a pharmaceutical product contained within the shaped blister container; and
c) a lid sealed onto a surface of the container, the lid being adjacent to a second surface of the fluoropolymer layer.

The invention further provides a process for forming a package, preferably a pharmaceutical package, comprising:
a) forming a multilayered film for holding a product, preferably a pharmaceutical product by:
  i) forming a polymeric base layer;
  ii) applying a fluoropolymer layer onto the polymeric base layer, which layers are attached via a first intermediate adhesive tie layer; and
  iii) molding the film into a shaped blister container, which container has an outer surface, an inner surface, and a cavity;
b) placing a product, such as a pharmaceutical product, into the cavity; and
c) heat sealing a lid onto the outer surface of the container, which lid comprises:
  i. a support layer adhered to the fluoropolymer layer via a second intermediate adhesive tie layer; and
  ii. a metallic foil layer on the support layer.

The invention therefore provides a desirable multilayered packaging film having excellent moisture barrier properties and which exhibits excellent adhesion of a fluoropolymer layer to polymer films, and blister packages formed therefrom.

DETAILED DESCRIPTION OF THE PREFERRED EMBODIMENTS

The multilayered film structure of the present invention allows for a fluoropolymer layer to be directly bonded to a lid-stock film in blister packaging with superior adhesive properties. In this construction, the packaged product is in contact with the fluoropolymer layer. This results in a significant reduction in the moisture vapor transmission rate into the package as compared to the usual application of fluoropolymer packaging films. Other properties also provided are chemical resistance, transparency to ultraviolet radiation, and clarity for ease of product detection.

Figure 1:
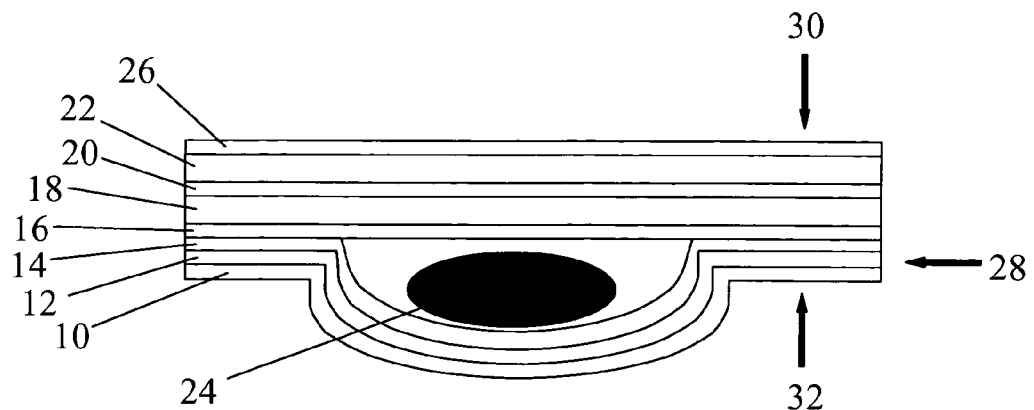
FIG. 1 is a schematic representation of a pharmaceutical package encapsulating a pharmaceutical product in which moisture is prevented from entering the package through the sides.
Figure 3:
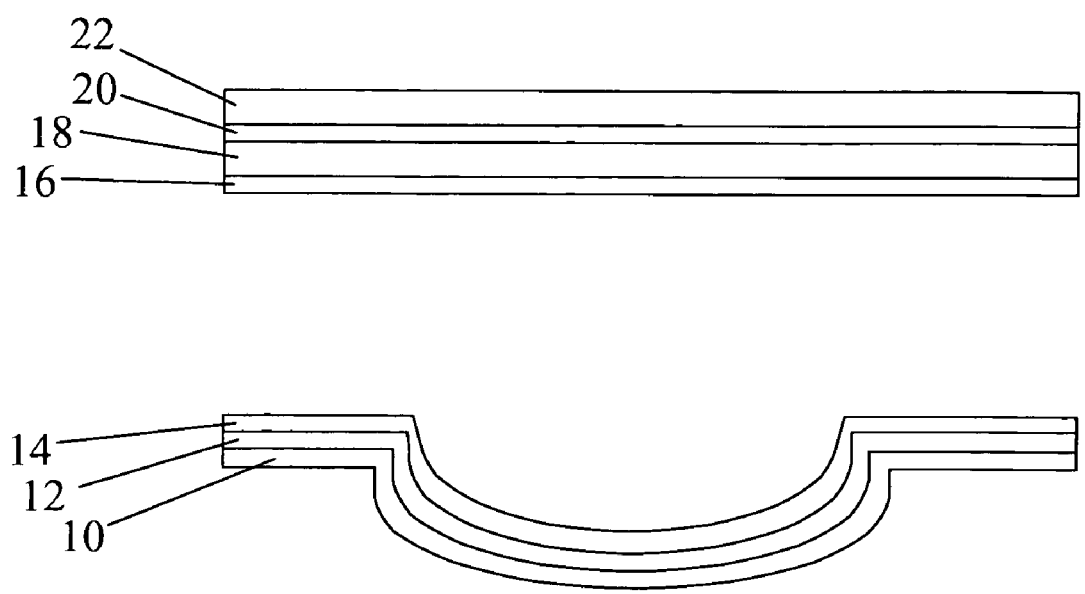
FIG. 3 is a schematic representation of a lid-stock and a thermoformed blister prior to sealing the lid-stock onto the fluoropolymer layer.

The multilayered film of the invention is depicted in FIGS. 1 and 3. FIG. 1 depicts a blister package of the invention after insertion of a pharmaceutical product and heat sealing of a lid-stock to the thermoformed film. FIG. 3 depicts the films of the invention prior to heat sealing the lid-stock to the thermoformed film. The multilayered film comprises a fluoropolymer layer 14 adhered to a polymeric base layer 10, a support layer 18 adhered to the fluoropolymer layer 14 and a metallic foil layer 22 on the support layer. In the preferred embodiment of the invention, the polymeric base layer 10 comprises a material such as polyamides, polyesters, polyolefins, including polyethylenes (PE) and polypropylene (PP), poly(vinyl chloride) (PVC), polyvinylidene chloride (PVdC), cyclic olefin copolymers (COC), polystyrene (PS), acrylics such as Barex®, available from BP and combinations thereof. Non-limiting examples of suitable polyethylenes are low density polyethylene (LDPE), linear low density polyethylene (LLDPE), linear medium density polyethylene (LMDPE), linear very-low density polyethylene (VLDPE), linear ultra-low density polyethylene (ULDPE), high density polyethylene (HDPE). Of these, the most preferred is low density polyethylene. Preferred polyesters include polyethylene terephthalate (PET) and glycol modified polyethylene terephthalate (PETG). Cyclic olefin polymers are described, for example, in U.S. Pat. Nos. 5,218,049; 5,783,273 and 5,912,070 which are incorporated herein by reference. Most preferred are copolymers of ethylene and norbornene. Cyclic olefins may be obtained commercially from Mitsui Petrochemical Industries, Ltd. of Tokyo, Japan, or Ticona of Summit, N.J.

Suitable polyamides within the scope of the invention are a wide range of polyamide homopolymers or copolymers. Useful polyamide homopolymers include poly(4-aminobutyric acid) (nylon 4), poly(6-aminohexanoic acid) (nylon 6, also known as poly(caprolactam)), poly(7-aminoheptanoic acid) (nylon 7), poly(8-aminooctanoic acid)(nylon 8), poly (9-aminononanoic acid) (nylon 9), poly(10-aminodecanoic acid) (nylon 10), poly(11-aminoundecanoic acid) (nylon 11), poly(12-aminododecanoic acid) (nylon 12). Useful polyamide copolymers include nylon 4,6, poly(hexamethylene adipamide) (nylon 6,6), poly(hexamethylene sebacamide) (nylon 6,10), poly(heptamethylene pimelamide) (nylon 7,7), poly(octamethylene suberamide) (nylon 8,8), poly (hexamethylene azelamide) (nylon 6,9), poly (nonamethylene azelamide) (nylon 9,9), poly (decamethylene azelamide) (nylon 10,9), poly (tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12) and the like. Other useful polyamide copolymers include caprolactam/hexamethylene adipamide copolymer (nylon 6,6/6), hexamethylene adipamide/caprolactam copolymer (nylon 6/6,6), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6), poly(tetramethylenediamine-co-isophthalic acid) (nylon 4,I), polyhexamethylene isophthalamide (nylon 6,I), hexamethylene adipamide/hexamethylene-isophthalamide (nylon 6,6/6I), hexamethylene adipamide/hexamethylene-terephthalamide (nylon 6,6/6T), poly (2,2,2-trimethyl hexamethylene terephthalamide), poly(m-xylylene adipamide) (MXD6), poly(p-xylylene adipamide), poly(hexamethylene terephthalamide), poly(dodecamethylene terephthalamide), polyamide 6T/6I, polyamide 6/MXDT/I, polyamide MXDI, and the like. Also included are other nylons which are not particularly delineated here, as well as combinations of those described herein. Of these polyamides, preferred polyamides include nylon 6, nylon 6,6, nylon 6/6,6 as well as mixtures of the same. Of these, nylon 6 is most preferred.

The polyamides used in the practice of this invention may be obtained from commercial sources or prepared in accordance with known preparatory techniques. For example, poly(caprolactam) can be obtained from Honeywell International Inc., Morristown, N.J. under the trademark CAPRON®.

This polymeric base layer 10 is either laminated to or coextruded with a fluoropolymer layer 14. Fluoropolymers suitable to form the fluoropolymer layer 14 include, but are not limited to, ethylene-chlorotrifluoroethylene (ECTFE), ethylene-tetrafluoroethylene copolymer, fluorinated ethylene-propylene copolymer, perfluoroalkoxyethylene, polychlorotrifluoroethylene (PCTFE) homopolymer or copolymer, polytetrafluoroethylene, polyvinylfluoride, polyvinylidene fluoride, and copolymers and blends thereof. Particularly preferred fluoropolymers include homopolymers and copolymers of PCTFE and copolymers of ECTFE. As used herein, copolymers include polymers having two or more monomer components. Such copolymers may contain up to 10%, and preferably up to 8% by weight of other comonomers, such as vinylidene fluoride and tetrafluoroethylene. Fluoropolymer films are described, for example, in U.S. Pat. Nos. 4,510,301, 4,544,721 and 5,139,878. Most preferred fluoropolymers are PCTFE fluoropolymers available as ACLAR® films from Honeywell International Inc. of Morristown, N.J.

The base layer 10 and the fluoropolymer layer 14 are attached to each other via a first intermediate adhesive tie layer 12. The adhesive layer 12 may be applied either directly onto either of the fluoropolymer layer 14 or base layer 10 by any appropriate means in the art, such as by coating. Any suitable adhesive, such as a polyurethane, an epoxy, a polyester, an acrylic, an anhydride modified polyolefin and blends thereof, may be employed. One type of adhesives includes modified polyolefin compositions having at least one functional moiety selected from the group consisting of unsaturated polycarboxylic acids and anhydrides thereof. Such unsaturated carboxylic acid and anhydrides include maleic acid and anhydride, fumaric acid and anhydride, crotonic acid and anhydride, citraconic acid and anhydride, itaconic acid an anhydride and the like. Of these, the most preferred is maleic anhydride. The modified polyolefins suitable for use in this invention include compositions described in U.S. Pat. Nos. 3,481,910; 3,480,580; 4,612,155 and 4,751,270. Other adhesive layers non-exclusively include alkyl ester copolymers of olefins and alkyl esters of α,β-ethylenically unsaturated carboxylic acids such as those described in U.S. Pat. No. 5,139,878. The modified polyolefin composition may comprise from about 0.001 and about 20 weight percent of the functional moiety, based on the total weight of the modified polyolefin. More preferably the functional moiety comprises from about 0.05 and about 10 weight percent, and most preferably from about 0.1 and about 5 weight percent. The modified polyolefin composition may also contain up to about 40 weight percent of thermoplastic elastomers and alkyl esters as described in U.S. Pat. No. 5,139,878.

This fluoropolymer/base polymer structure is thermoformed into a blister or other shaped container using techniques that are well known in the art. The film is molded such that the blister has an outer surface, an inner surface and a cavity. After thermoforming, a pharmaceutical product 24, i.e. a tablet or capsule, is inserted into the cavity and the structure is heat sealed with a lid-stock film by heat sealing the outer surface of the lid-stock film directly to the fluoropolymer layer 14. In the preferred embodiment of the invention, the lid-stock film comprises a support layer 18 adhered to the fluoropolymer layer 14 via a second intermediate adhesive tie layer 16, and a metallic foil layer 22 on the support layer via a third intermediate adhesive tie layer 20. The support layer 18 is preferably comprised of a thermoplastic material, and is preferably a material selected from the group consisting of polyolefins, polyamides, polyesters, polystyrene, poly(vinyl chloride), polyvinylidene chloride, polyurethanes and combinations thereof.

Suitable polyolefins non-exclusively include poly(α-olefins) and copolymers and blends thereof, wherein the α-olefin monomers have from about 2 to about 10 and preferably from about 2 to about 6 carbon atoms. Non-limiting examples of polyolefins include the polyethylenes described above, polypropylene, polybutylene, polybutene-1, polypentene-1, poly-3-methylbutene-1, poly-4-methylpentene-1, polyhexene, copolymers of polyolefins, copolymers of olefins and other polymers such as polyvinyl chloride, polyvinylidene chloride, polystyrene, polyurethane, and combinations thereof. Of these, the preferred polyolefins are polyethylene and polypropylene, with polypropylene being most preferred. Suitable polyamides are those listed above. Preferred polyesters non-exclusively include polyethylene terephthalate (PET) and glycol modified polyethylene terephthalate (PETG).

In the preferred embodiment of the invention, the second intermediate adhesive tie layer 16 comprises an adhesive that exhibits excellent adhesion to a fluoropolymer layer. Any suitable adhesive may be used, and adhesive layer 16 may be the same or different from adhesive layer 12. For example, the second intermediate adhesive tie layer 16 may comprise a blend of polymeric materials, namely (1) an olefin-containing polymer selected from the group consisting of at least one functionalized polyolefin; at least one copolymer of ethylene and at least one comonomer selected from the group consisting of acrylic acid, alkyl acrylic acid, acrylates, and alkyl acrylates; and blends thereof and (2) a styrene-containing rubber. One type of olefin-containing polymer is a functionalized olefin polymer which contains at least one functional moiety. Among the functional moieties that may be employed are unsaturated carboxylic acids, unsaturated carboxylic acid anhydrides, amines and epoxies. Examples of olefins employable for the preparation of the modified polyolefins include homopolymers or copolymers of an .alpha.-olefin such as ethylene, propylene, butene-1, pentene-1, hexene-1, 4-methyl-pentene-1 and octene-1. Unsaturated carboxylic acids and anhydrides useful to modify the polyolefins include maleic acid and anhydride, fumaric acid and anhydride, crotonic acid and anhydride, citraconic acid and anhydride, itaconic acid and anhydride and the like. Of these, the most preferred is maleic anhydride. Suitable amines include aliphatic or aromatic, primary, secondary and tertiary amines, such as 2,4,6-tribromoaniline, methylamine, ethylamine, propylamine, dimethylamine, N-methylaniline, ethylmethylamine, 2-(N-methylamine)heptane, sec-butyldimethylamine, N-ethyl-N-methylaniline, trimethylamine, N,N-dimethylanaline, and the like. Suitable epoxies include those having from about 2 to about 20 carbon atoms. The modified polyolefins suitable for use in this invention include compositions described in U.S. Pat. Nos. 3,481,910; 3,480,580; 4,612,155 and 4,751,270 which are incorporated herein by reference.

The modified polyolefin composition may comprise from about 0.001 and about 10 weight percent of the functional moiety, based on the total weight of the modified polyolefin. More preferably, the functional moiety comprises from about 0.005 and about 5 weight percent, and most preferably from about 0.01 and about 2 weight percent.

Another type of olefin-containing polymer useful herein is a copolymer of ethylene and acrylic acid, alkyl acrylic acid, acrylates and/or alkyl acrylates. The alkyl acrylic acids or alkyl acrylates contain alkyl groups preferably of from about 2 to about 4 carbon atoms. Preferred among these types of polymer is an ethylene methyl acrylate copolymer.

The second tie layer 16 may also include a styrene-containing rubber, for example, styrene block copolymers, such as hydrogenated styrene-butadiene-styrene block copolymers, also referred to as styrene-ethylene-butylene-styrene (SEBS) block copolymers. Other polymeric materials may be present in the second tie layer 16, such as high melt viscosity polyolefins.

The styrene-containing rubber may comprise, for example, from about 1 to about 35%, and more preferably from about 5 to about 20%, by weight based on the total weight of the second tie layer 16.

These adhesive materials are described thoroughly in U.S. Pat. No. 6,306,503, which is incorporated herein by reference. Other suitable adhesive materials include those described in U.S. Pat. Nos. 5,874,035 and 5,945,221, which are also incorporated herein by reference.

The preferred metallic foil is an aluminum foil, although any suitable metal foil may be substituted for aluminum if desired. Binding the foil 22 to the support layer 18 is a third intermediate adhesive tie layer 20. This third tie layer 20 may be any suitable adhesive, and may comprise any of the adhesive materials described herein. It may be the same as or different from that of the other adhesive layers. In an alternate embodiment of the invention, an additional layer of a paper 26 may be attached to the foil layer 18 via an other adhesive tie layer. This optional paper layer 26 preferably has printed indicia thereon. Alternately, the foil layer 22 may have printed indicia thereon, e.g. indicia that describes the identity of the product contained within the blister package. In some applications, the foil layer may be employed without a support layer. In addition, the support layer may be in the form of a coating on the foil layer.

Each of the fluoropolymer layer 14, base layer 10, support layer 18 and adhesive layers may optionally also include one or more conventional additives whose uses are well known to those skilled in the art. The use of such additives may be desirable in enhancing the processing of the compositions as well as improving the products or articles formed therefrom. Examples of such include oxidative and thermal stabilizers, lubricants, release agents, flame-retarding agents, oxidation inhibitors, oxidation scavengers, dyes, pigments and other coloring agents, ultraviolet light absorbers and stabilizers, organic or inorganic fillers including particulate and fibrous fillers, reinforcing agents, nucleators, plasticizers, as well as other conventional additives known to the art. Such may be used in amounts, for example, of up to about 10% by weight of the overall composition. Representative ultraviolet light stabilizers include various substituted resorcinols, salicylates, benzotriazole, benzophenones, and the like. Suitable lubricants and release agents include stearic acid, stearyl alcohol, and stearamides. Exemplary flame-retardants include organic halogenated compounds, including decabromodiphenyl ether and the like as well as inorganic compounds. Suitable coloring agents including dyes and pigments include cadmium sulfide, cadmium selenide, titanium dioxide, phthalocyanines, ultramarine blue, nigrosine, carbon black and the like. Representative oxidative and thermal stabilizers include the Period Table of Element's Group I metal halides, such as sodium halides, potassium halides, lithium halides; as well as cuprous halides; and further, chlorides, bromides, iodides. Also, hindered phenols, hydroquinones, aromatic amines as well as substituted members of those above mentioned groups and combinations thereof. Exemplary plasticizers include lactams such as caprolactam and lauryl lactam, sulfonamides such as o,p-toluenesulfonamide and N-ethyl, N-butyl benylnesulfonamide, and combinations of any of the above, as well as other plasticizers known to the art. However, it is most preferred that each of the fluoropolymer layer, first intermediate adhesive tie layer and polymeric base layer are substantially transparent to provide an overall substantially transparent film.

Each of the fluoropolymer layer 14, base layer 10 and support layer 18 may be stretched or oriented in any desired direction using methods well known to those skilled in the art. For purposes of this invention, the terms "orienting" and "stretching" shall be used interchangeably. Examples of such methods include those set forth in U.S. Pat. No. 4,510,301. In such a stretching operation, the layers may be stretched uniaxially in either the direction coincident with the direction of movement of the film being withdrawn from the casting roll, also referred to in the art as the "machine direction", or in as direction which is perpendicular to the machine direction, and referred to in the art as the "transverse direction", or biaxially in both the machine direction and the transverse direction. The multilayered film structure of the invention is particularly useful for forming thermoformed three dimensionally shaped articles such as blister packaging for pharmaceuticals. This may be done by forming the film around a suitable mold and heating in a method well known in the art. We have found that the fluoropolymer films of the present invention have sufficient dimensional stability to be stretched at least about 1.5 and preferably from about 1.5 to about 10 times in either the machine direction or the transverse direction or both. The fluoropolymer/base polymer layers may be stretched after being adhered together by the first intermediate adhesive layer. The multilayered film therefore exhibits improved tensile modulus, mechanical strength, and excellent barrier properties towards both water vapor and oxygen after being stretched.

Each layer described above may have different thicknesses. For example, the thickness of each of the fluoropolymer layer 14, base layer 10 and support layer 18 in the post-stretched films structure may range from about 1.3 µm to about 2540 µm, and preferably from about 1.3 µm to about 1270 µm. The thickness of the post-stretched adhesive layers may vary, such as in the range of from about 1 µm to about 305 µm, preferably from about 1.3 µm to about 25 µm, and most preferably from about 2.5 µm to about 20 µm. While such thicknesses are preferred as providing a readily flexible film, it is to be understood that other film thicknesses may be produced to satisfy a particular need and yet fall within the scope of the present invention.

In the preferred embodiment of the invention, the fluoropolymer layer 14 and the base layer 10 are attached by lamination under heat and pressure via the first intermediate adhesive tie layer 12, and the support layer 18 is preferably attached to the fluoropolymer layer 14 by lamination via the second intermediate adhesive tie layer 16. Lamination techniques are well known in the art. Typically, laminating is done by positioning the individual layers on one another under conditions of sufficient heat and pressure to cause the layers to combine into a unitary film. Typically the films are positioned on one another, and the combination is passed through the nip of a pair of heated laminating rollers by techniques well known in the art. Lamination heating may be done at temperatures ranging, for example, from about 120° C. to about 175° C., preferably from about 150° C. to about 175° C., at pressures ranging, for example, from about 5 psig (0.034 MPa) to about 100 psig (0.69 MPa), for a time period, for example, of from about 5 seconds to about 5 minutes, preferably from about 30 seconds to about 1 minute. Additionally, the foil layer 22 and support layer 18 are laminated via the third intermediate adhesive tie layer 20.

In an alternate embodiment of the invention, the fluoropolymer layer 14 and the base layer 10 may be attached by coextrusion. For example, the polymeric material for the individual layers are fed into infeed hoppers of a like number of extruders, each extruder handling the material for one or more of the layers. The melted and plasticated streams from the individual extruders are fed into a single manifold co-extrusion die. While in the die, the layers are juxtaposed and combined, then emerge from the die as a single multiple layer film of polymeric material. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. Additional rolls may be employed. In another method, the film forming apparatus may be one which is referred to in the art as a blown film apparatus and includes a multi-manifold circular die head for bubble blown film through which the plasticized film composition is forced and formed into a film bubble which may ultimately be collapsed and formed into a film. Processes of coextrusion to form film and sheet laminates are generally known. Typical coextrusion techniques are described in U.S. Pat. Nos. 5,139,878 and 4,677,017.

Figure 2:
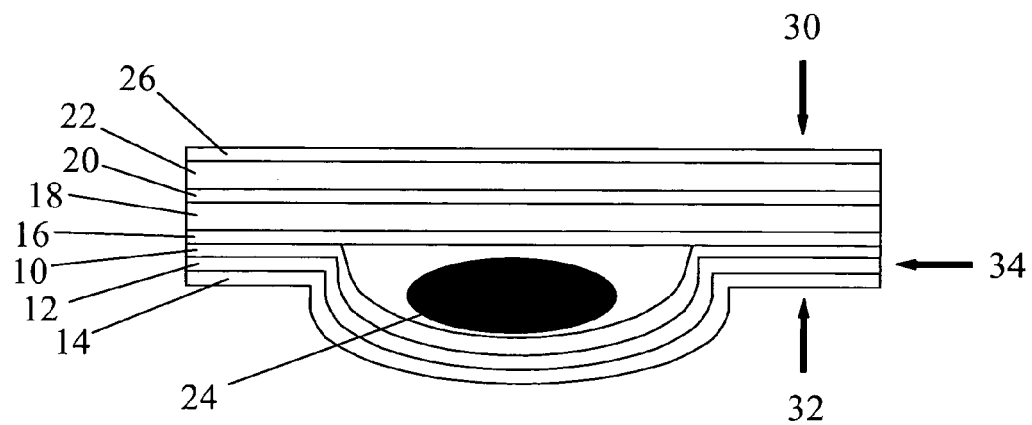
FIG. 2 is a schematic representation of a prior art package in which moisture is not prevented from entering the package through the sides.

The result is a multilayered blister packaging film having a moisture transmission rate of less than about 0.05 gm/100 in²/day per mil thickness of the fluorocarbon layer, more preferably from about 0.001 to about 0.05 gm/100 in²/day per mil thickness of the fluorocarbon layer. As shown in FIG. 1, by attaching the fluoropolymer layer directly to the lid-stock, such that the pharmaceutical product is in direct contact with the fluoropolymer layer, moisture is prevented from entering the sealed package from all directions. Particularly, the blister package of the invention is capable of preventing moisture from entering the package from the top 30 of the package, the bottom 32 of the package and the side 28 of the package. This is distinguished from the prior art which does not effectively prevent moisture from entering the package from the sides of the package. Referring to FIG. 2, the layers of the prior art blister package are arranged such that the fluoropolymer layer 14 is the outermost layer from the lid-stock and the base layer 10 is directly sealed to the lid-stock. This configuration is sufficient to prevent moisture from entering the package from the top 30 of the package and from the bottom 32 of the package. However, the base layer 10, which is a poor moisture barrier, is not able to prevent moisture from penetrating the package through the side 34. Particularly, while moisture is able to seep in between the fluoropolymer layer and the base layer of either configuration, the fluoropolymer placement from the prior art structure in FIG. 2 is unable to prevent the moisture from entering the container area of the package, while the fluoropolymer placement in FIG. 1 effectively blocks the transmission of the moisture. This is a particular advantage over prior blister package constructions, because when moisture seeps in through any location, the product sealed within is compromised.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A process for forming a pharmaceutical package comprising:
   a) forming a multilayered film for holding a pharmaceutical product by:
      i) forming a polymeric base layer;
      ii) applying a fluoropolymer layer onto said polymeric base layer, which layers are attached via a first intermediate adhesive tie layer; and
      iii) molding said film into a shaped blister container, which container has an outer surface, an inner surface, and a cavity;
   b) placing a pharmaceutical product into said cavity; and
   c) heat sealing a lid onto the outer surface of said container to close said product filled cavity, which lid comprises:
      i) a support layer adhered to said fluoropolymer layer via a second intermediate adhesive tie layer; and
      ii) a metallic foil layer adhered to said support layer.

2. The process of claim 1 wherein said pharmaceutical product comprises a tablet or a capsule.

3. The process of claim 1 wherein said base layer and said fluoropolymer layer are coextruded.

4. The process of claim 1 wherein said base layer and said fluoropolymer layer are laminated together.

5. The process of claim 1 wherein said molding comprises thermoforming.

6. The process of claim 1 further comprising adhering a paper to said foil layer via an intermediate adhesive layer.

7. The process of claim 1 wherein said fluoropolymer layer comprises a polychlorotrifluoroethylene homopolymer or copolymer.

8. The process of claim 1 wherein said the polymeric base layer comprises a material selected from the group consisting of polyamides, polyolefins, cyclic olefin copolymers, polyesters, poly(vinyl chloride), polyvinylidene chloride, polystyrene, acrylics and combinations thereof.

9. The process of claim 1 wherein said support layer comprises a material selected from the group consisting of polyolefins, polyamides, polyesters, polystyrene, poly(vinyl chloride), polyvinylidene chloride, polyurethanes and combinations thereof.

10. The process of claim 1 wherein said support layer comprises polyethylene terephthalate.

11. The process of claim 1 wherein said metaflic foil comprises an aluminum foil.

12. The process of claim 1 wherein said first intermediate adhesive tie layer comprises a material selected from the group consisting of a polyurethane, an epoxy, a polyester, an acrylic, an anhydride modified polyolefin and blends thereof.

13. The process of claim 1 wherein said second intermediate adhesive tie layer comprises a blend of (1) an olefin-containing polymer selected from the group consisting of at least one functionalized polyolefin; at least one copolymer of ethylene and at least one comonomer selected from the group consisting of acrylic acid, alkyl acrylic acid, acrylates, and alkyl acrylates; and blends thereof and (2) a styrene-ethylene-butylene-s-tyrene block copolymer.

14. A process for forming a package comprising:
a) forming a multilayered film for holding a product by:
  i) forming a polymeric base layer;
  ii) applying a fluoropolymer layer onto said polymeric base layer, which layers are attached via a first intermediate adhesive tie layer; and
  iii) molding said film into a shaped container, which container has an outer surface, an inner surface, and a cavity;
b) placing a product into the cavity; and
c) heat sealing a lid onto the outer surface of the container to close the product filled cavity, which lid comprises:
  i) a support layer adhered to said fluoropolymer layer via a second intermediate adhesive tie layer; and
  ii) a metallic foil layer adhered to said support layer.

* * * * *